(12) United States Patent
Mahadevan et al.

(10) Patent No.: US 10,212,068 B2
(45) Date of Patent: Feb. 19, 2019

(54) MULTICAST ROUTING VIA NON-MINIMAL PATHS

(71) Applicant: DELL PRODUCTS L.P., Round Rock, TX (US)

(72) Inventors: Ramasubramani Mahadevan, Tamil Nadu (IN); Shivakumar Sundaram, Tamil Nadu (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 15/417,004

(22) Filed: Jan. 26, 2017

(65) Prior Publication Data

US 2017/0141997 A1   May 18, 2017

Related U.S. Application Data

(63) Continuation of application No. 14/509,918, filed on Oct. 8, 2014, now Pat. No. 9,590,889.

(51) Int. Cl.
| | | |
|---|---|---|
| *H04L 12/18* | (2006.01) | |
| *H04L 12/721* | (2013.01) | |
| *H04L 12/761* | (2013.01) | |
| *H04L 12/705* | (2013.01) | |

(52) U.S. Cl.
CPC ............. *H04L 45/12* (2013.01); *H04L 12/18* (2013.01); *H04L 12/185* (2013.01); *H04L 12/1877* (2013.01); *H04L 45/16* (2013.01); *H04L 45/18* (2013.01)

(58) Field of Classification Search
CPC ....... H04L 45/128; H04L 45/22; H04L 45/28; H04L 12/18; H04L 45/12; H04L 45/16; H04L 45/48
See application file for complete search history.

(56) References Cited

U.S. PATENT DOCUMENTS

| | | | |
|---|---|---|---|
| 7,362,709 B1 | 4/2008 | Hui et al. | 370/221 |
| 8,958,286 B1 * | 2/2015 | Atlas | H04L 12/18 370/225 |
| 9,008,088 B2 | 4/2015 | Ashwood-Smith et al. | 370/390 |
| 9,013,976 B2 | 4/2015 | Atlas et al. | 370/217 |
| 9,393,208 B2 | 6/2016 | Judge et al. | 370/217 |
| 9,614,726 B2 * | 4/2017 | Farkas | H04L 45/48 |
| 2009/0201803 A1 | 8/2009 | Filsfils et al. | |
| 2012/0106347 A1 | 5/2012 | Allan et al. | |

* cited by examiner

*Primary Examiner* — Ayar R Sheikh
*Assistant Examiner* — Debebe A Asefa
(74) *Attorney, Agent, or Firm* — Haynes and Boone, LLP.

(57) ABSTRACT

A method of routing traffic for multi-cast routing through a node of a network that utilizes loop-free alternative paths is presented. The method includes receiving a join in the node from a second node in the network on a shortest path between the node and the second node; retrieving loop-free alternative paths to the second node; and adding an entry to a multi-cast routing table at the node that is based on a group that includes the shortest path to the second node and the loop-free alternative paths to the second node as cost equivalent paths.

14 Claims, 5 Drawing Sheets

MULTICAST ROUTING VIA NON-MINIMAL PATHS

RELATED APPLICATIONS

The present application is a continuation of U.S. patent application Ser. No. 14/509,918 filed on Oct. 8, 2014, which is incorporated by reference in its entirety.

TECHNICAL FIELD

Embodiments of the present invention are related to multicast routing and, in particular, to multicast routing using non-minimal paths.

DISCUSSION OF RELATED ART

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

In many systems, typical multicast routing trees are built using a shortest path by sending, for example, protocol independent multicast (PIM) protocol join/prune (J/P) messages. Such messages use the incoming interface on which the join message came rooted at the rendezvous point (RP) or source. This procedure prevents all possible loop-free paths from being used for multicast routing and thereby leads to poor utilization of the network's cross-sectional bandwidth.

Therefore, there is a need to develop a better system for handling multicast routing in a network system.

SUMMARY

In accordance with aspects of the present invention, a method of routing traffic for multi-cast routing through a node of a network. In some embodiments, a method of routing traffic for multi-cast routing through a node of a network includes receiving a join in the node from a second node in the network on a shortest path between the node and the second node; retrieving loop-free alternative paths to the second node; and adding an entry to a multi-cast routing table at the node that is based on a group that includes the shortest path to the second node and the loop-free alternative paths to the second node as cost equivalent paths.

These and other embodiments are further discussed below with respect to the following figures.

DETAILED DESCRIPTION

Figure 1A:
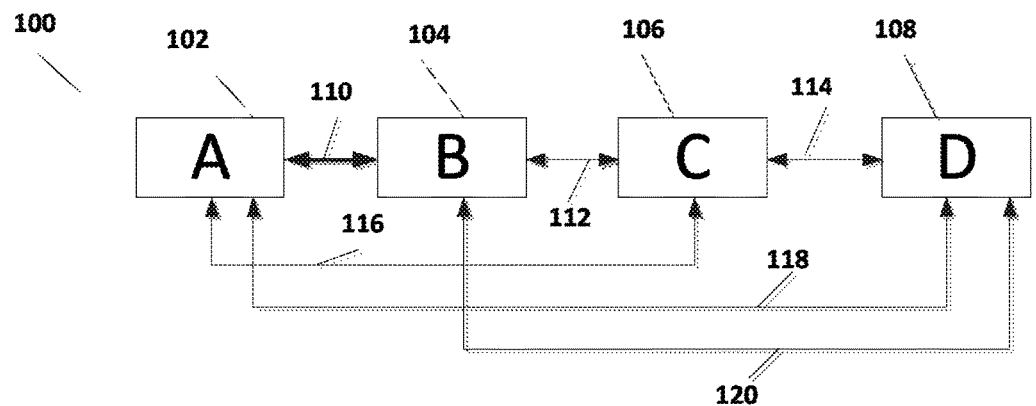
FIGS. 1A, 1B, 1C, and 1D illustrate communications channels between nodes and various routings, including loop-free alternative paths illustrated when one of the routings fails.

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various mechanical, compositional, structural, and operational changes may be made without departing from the spirit and scope of this description and the claims. In some instances, well-known structures and techniques have not been shown or described in detail in order not to obscure the invention.

Additionally, the drawings are not to scale. Relative sizes of components are for illustrative purposes only and do not reflect the actual sizes that may occur in any actual embodiment of the invention. Like numbers in two or more figures represent the same or similar elements.

The singular forms "a", "an", and "the" are intended to include the plural forms as well, unless the context indicates otherwise. And, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components. In a chassis environment, IHS systems include blades, which are individual systems designed to be inserted into slots on a chassis.

In a network, for example like CLOS or Flattened butterfly among others, there could be multiple unequal paths to reach a given node. A typical multicast is built using the shortest path by sending PIM J/P messages that use the incoming interface on which the join came rooted at the RP or source. Other multicast forwarding protocols, for example like DVMRP, Bidir, TRILL, or internal fabrics within a switch or a router can send similar join messages. This prevents all possible loop free paths to be used for multicast routing and leads to poorer utilization of the network's cross-sectional bandwidth.

According to some embodiments of the present invention, all of the possible paths are used to construct a multicast tree instead of preferring only the shortest path to reach the RP or source. This approach provides better load balancing of multicast traffic for different sets of groups rooted at a single RP. Unicast routing can compute all possible loop-free paths in order to achieve this routing. The PIM protocol can make use of those additional paths to load balance across different multicast group addresses. Traffic can be replicated to the desired node amongst one of the all-possible paths to a given node which further replicates it to its connected receivers. Such an approach is applicable for any kind of network topology, for example CLOS or flattened butterfly.

The joins from a downstream node arrives on the shortest path between the two nodes. Upon receipt of a join, the protocol uses a lookup for its unicast route table DB which provides all possible loop free paths for a given neighbor. For example, if a join came from a node B to node A, then Node A can possibly use one of the loop free alternatives (LFAs) to reach node B rather than using the same shortest path interface to node B on which the join was received. The LFA paths referred here are tunneled paths to that particular node. So the multicast traffic is carried in a unicast tunnel to be delivered to that node, which would terminate and replicate to its local receivers. These unicast tunnels would have been set up already using unicast routing loop free alternative path computation. By this way each multicast group within a RP or source can be load shared across different paths and thereby make efficient use of all available bandwidth for replication. The hardware installs the multicast rout table in such a way that all of the ECMP maps are construed or grouped as one single logical interface. That way, irrespective of the upstream node choosing a particular path, the downstream node can receive the traffic with valid RPF checks passed and replicate the traffic.

FIG. 1A illustrates loop-free alternative topologies in a flattened butterfly topology. Loop-free alternatives from node A 102 for reaching one of nodes B 104, C 106, or D 108 are illustrates. Each of nodes 102, 104, 106 and 108 are linked in routing tables. As shown in FIG. 1, node A 102 is linked to node B 104 through link 110, is linked to node C through link 116, and is linked to node D through link 118. Further, node B 104 is linked to node C through link 112 and is linked to node D through link 120. Node C is linked to node D through link 114.

Multiple loop-free connections can be made from node A 102 that access each of nodes B 104, C 106, and D 108. For example, the routing from node A 102 to node B 104 through link 110 is the directed routing from node A 102 to node B 104. However, loop-free alternative routings between node A 102 to node B 104 may first be directed through link 116 to node C 106 or through link 118 to node D 108. The loop-free alternative (lfa) routings involve a routings that utilize more than one link.

Figure 1B:
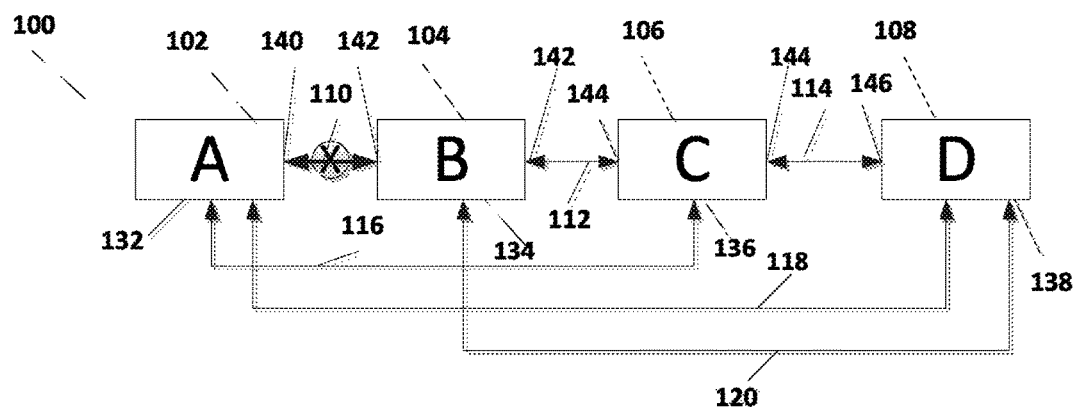
Figure 1C:
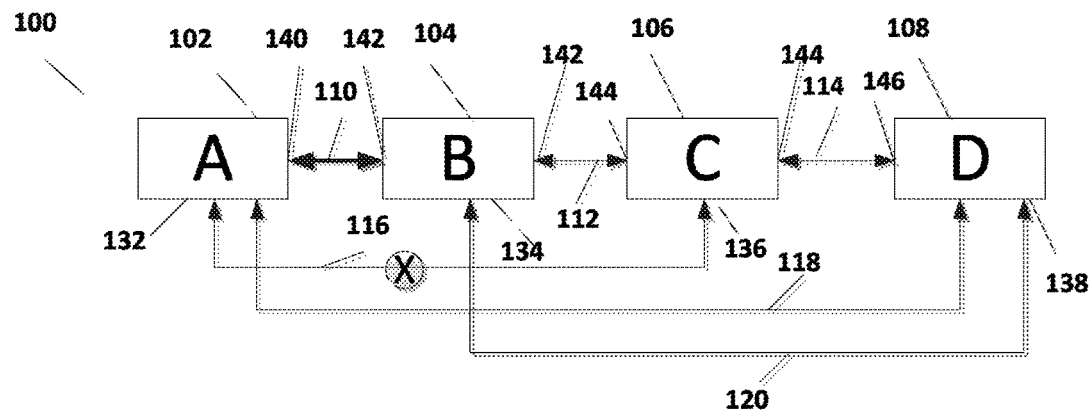
Figure 1D:
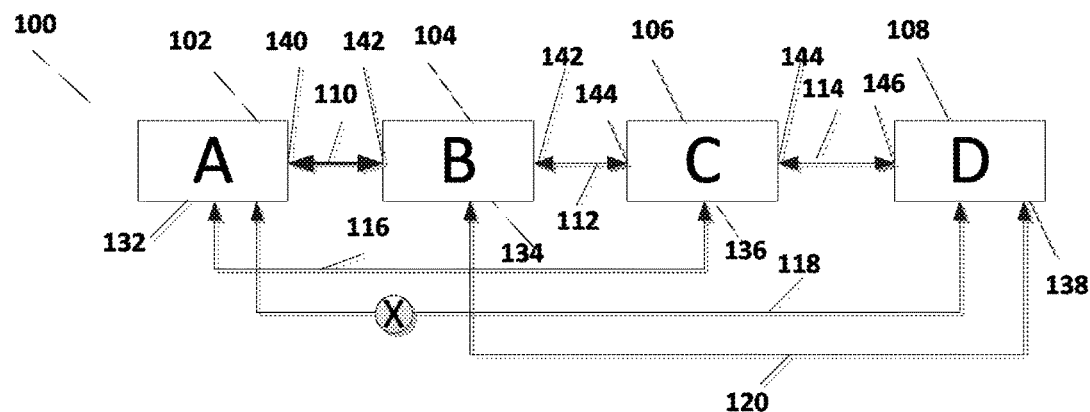

For example, FIG. 1B illustrates the loop-free alternative routings between Node A 102 and Node B 104, which includes links except for the direct link 110 between node A 102 and node B 104. FIG. 1C illustrates the loop-free alternative routings between Node A 102 and node C 106, which includes links other than the direct link 116 between node A 102 and node C 106. FIG. 1D illustrates the loop-free alternative routings between Node A 102 and node D 108, which includes links other than the direct link 118 between node A 102 and node D 108.

Figure 1E:
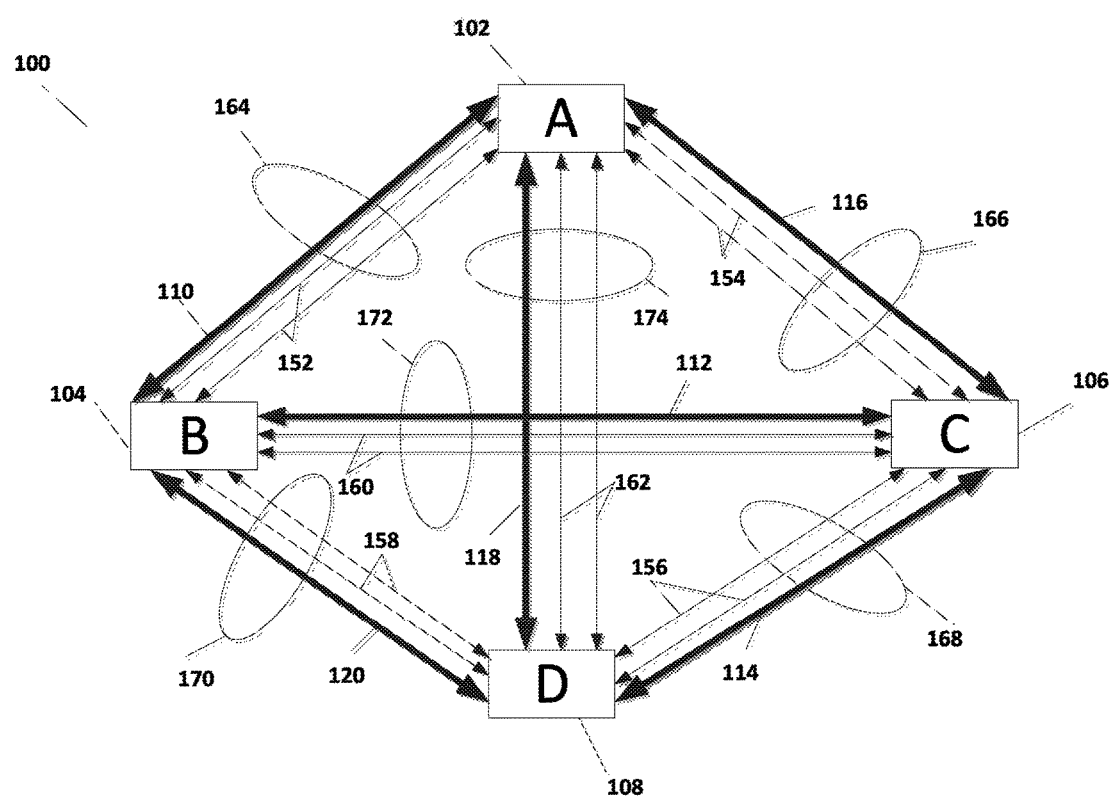
FIG. 1E illustrates an overall logical topology of the communication channels between nodes for the illustrated physical topology illustrated in FIG. 1A.

FIG. 1E illustrates the logical topology of the network illustrated in FIGS. 1A through 1D. As shown in FIG. 1E, links between node A 102 and node B 104 include direct path 110 and alternative paths 152, all of which can be logically grouped as equal cost path group 154. Similarly, links between node A 102 and node C 106 includes direct path 116 and alternative paths 154 that can be grouped as equal cost path group 166. Links between node A 102 and node D 108 includes direct path 118 and alternative paths 162 that can be grouped as equal cost path group 174. Links between node B 104 and node C 106 includes direct path 112 and alternative paths 160 that can be grouped as equal cost path group 172. Links between node B 104 and node D 108 include direct path 120 and alternative paths 158 that can be grouped as equal cost path group 170. Links between node C 106 and node D 108 include direct path 115 and alternative paths 156 that can be grouped as equal cost path group 168.

By transforming the physical topology to the logical topology illustrated in FIG. 1E, all interconnect links—direct paths and loop-free alternative paths—can be utilized evenly for traffic forwarding thereby enabling non-blocking performance for the network. By using tunnels to represent the loop-free alternative paths, the loop-free alternative paths can be considered as equal cost alternatives paths to the shortest paths between nodes. In order to ensure that reverse path forwarding checks employed by multicast routing protocols, for example like PIM, succeed for paths traversed through the tunnels, the tunnel interfaces are automatically added to the routing tables as valid logical input interfaces along with the shortest path based input interface Table I below illustrates a unicast routing table for node A 102 using loop-free alternative paths. The routing table illustrates the next-hop for a packet destined from node A 102 to one of nodes B 104, C 106, or D 108. As is illustrated in Table I, the next hop can define either a direct hop to the destination node or a hop to the first node in a loop-free alternative route that ends at the destination node. For example, in the entry where the ingress port is the front-end port of Node A 102 and the destination is node B 104, the next hop may be node B, node C to route on a loop-free alternative path to node B, or to node D to route on a loop-free alternative path to node B.

TABLE I

| Ingress Port | Destination link | Next Hop |
|---|---|---|
| Front-end port | Node A 102 | Local Destination Front-End Port |
| Front-end port | Node B 104 | B, C(-lfa), D(-lfa) |
| Front-end port | Node C 106 | C, B(-lfa), D(-lfa) |
| Front-end port | Node D 108 | D, B(-lfa), C(-lfa) |
| Dimension X (non-front end port) | Node A 102 | Local Destination Front-End Port |
| Dimension X (non-front end port) | Node B 104 | B |
| Dimension X (non-front end port) | Node C 106 | C |
| Dimension X (non-front end port) | Node D 108 | D |

All routes are replicated for each network dimension as separate virtual routing and forwarding (vrf) routing tables. The total number of forwarding entries into the routing table is equal to the total number of routes times the number of dimensions.

Figure 2A:
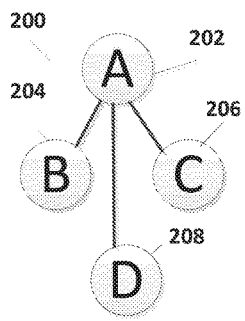
FIGS. 2A through 2M illustrate various paths between nodes.
Figure 2B:
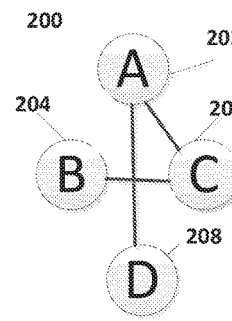

FIGS. 2A through 2M illustrate loop-free trees showing routes from node A 202 to nodes B 204, C 206, and D 208. As shown in FIGS. 2A through 2M, there are n possible loop free trees that can be formed from node A 202. For different groups rooted at node A 202, different trees can be assigned so that unequal paths can be used to reach a given node from node A 202. In FIG. 2A, each of nodes B 204, C 206, and D 208 is reached directly from node A 202.

Figure 2C:
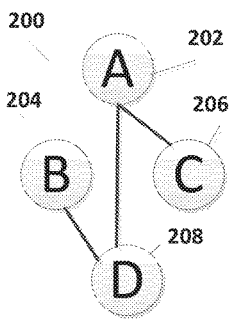
Figure 2D:
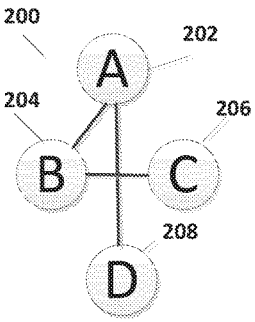
Figure 2E:
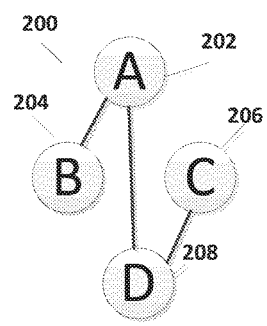
Figure 2F:
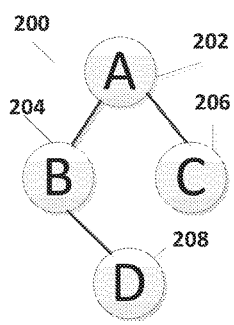
Figure 2G:
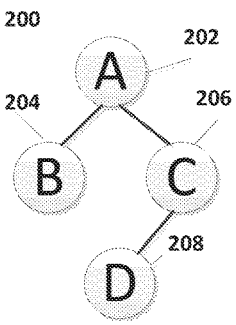

In FIGS. 2B through 2G, two nodes are reached directly from node A 202 but the path to the third node is reached through one of the directly reached nodes. As shown, in FIG. 2B, node B 204 is reached through node C; In FIG. 2C, node B 204 is reached through node D 208; In FIG. 2D, node C 206 is reached through node B 204; IN FIG. 2E, node C 206 is reached through node D 208; In FIG. 2F, node D 208 is reached through node B 204; and in FIG. 2G, node D 208 is reached through node C 206.

Figure 2H:
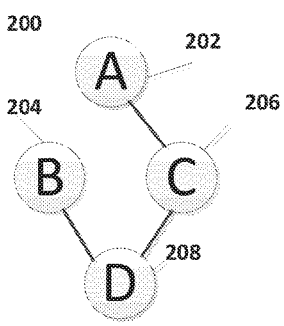
Figure 2I:
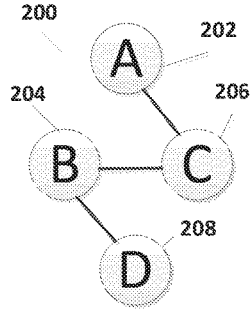
Figure 2J:
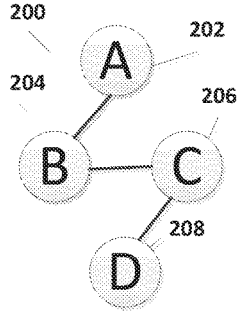
Figure 2K:
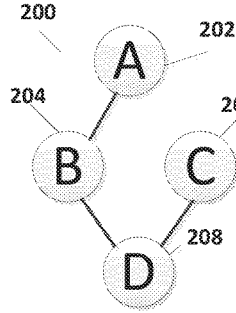
Figure 2L:
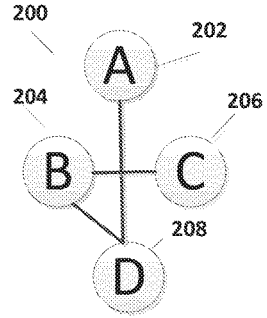
Figure 2M:
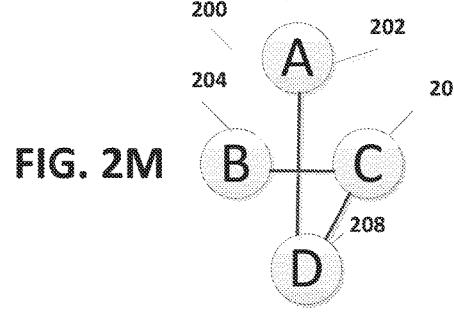

In FIGS. 2H through 2M one node is reached through the other two nodes. As shown in FIG. 2H, node C 206 is reached directly from node A 202, node D 208 is reached through node C 206, and node B is reached through node C 206 and D 208. In FIG. 2I, the pathway from node A 202 is A→C→B→D. In FIG. 2J, the pathway from node A 202 is A→B→C→D. In FIG. 2K, the pathway from node A 202 is A→B→D→C. In FIG. 2L, the pathway from node A 202 is A→D→B→C. In FIG. 2M, the pathway from node A 202 is A→D→C→B.

Figure 3:
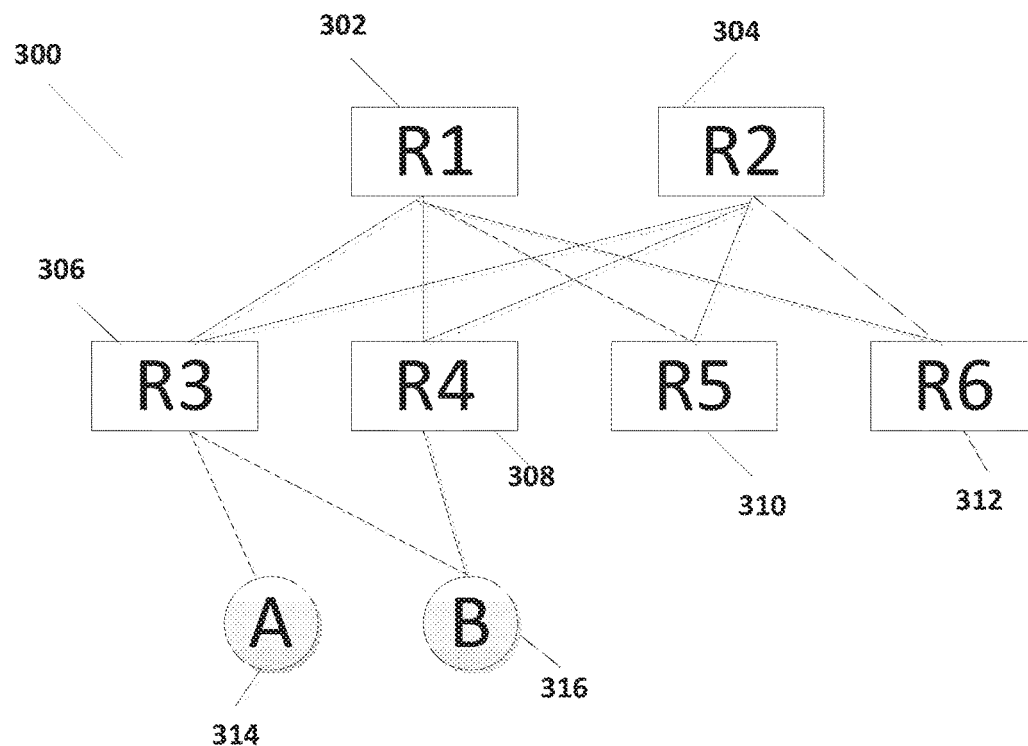
FIG. 3 illustrates various paths between nodes in a CLOS topology network.

FIG. 3 illustrates non-minimal routing in an example CLOS network 300. In network 300, routers R1 302 and R2 304 are each linked to routers R3 306, R4 308, R5 310, and R6 312. Router R3 306 is linked to node A 314 and to node B 316. Router R4 308 is linked to node B 316. As illustrated in FIG. 3, there are multiple paths to reach node B 316 from node A 314. For example, the following loop-free paths lead from node A 314 to node B 316:
A→R3→B;
A→R3→R1→R4→B;
A→R3→R2→R4→B;
A→R3→R1→R5→R2→R4→B;
A→R3→R1→R6→R2→R4→B;
A→R3→R2→R5→R1→R4→B;
A→R3→R2→R6→R1→R4→B.
In general, there are "n" possible loop-free trees that could be formed from router R3 306. Therefore, in accordance with some embodiments of the present invention, different path trees are assigned from router R3 306 that correspond to all unequal paths originating at node A 314 and destined to node B 316. This process occurs for each pair of nodes in the network where traffic is sent (for example a node C, not shown, that is linked to router R6 312).

Figure 4:
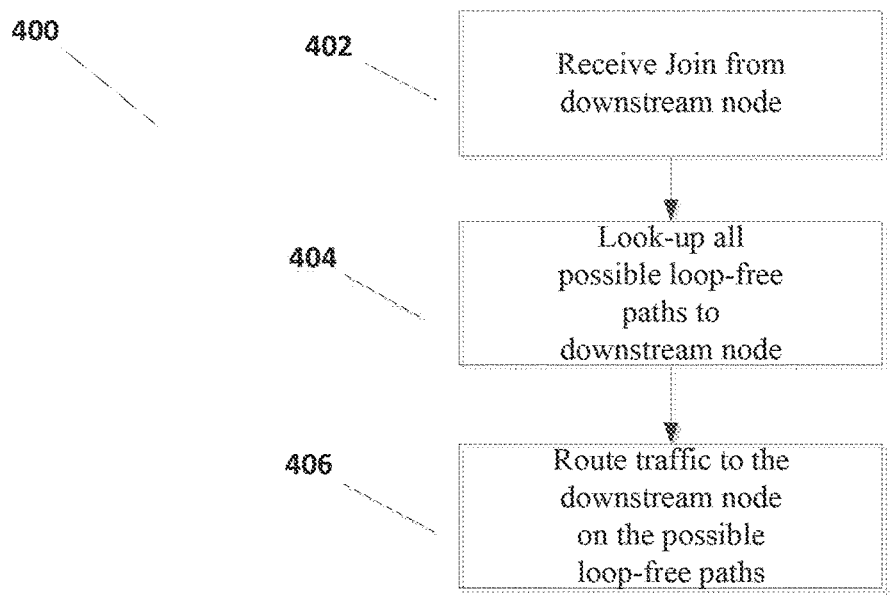
FIG. 4 illustrates a process for implementing embodiments of the present invention.

FIG. 4 illustrates a procedure 400 according to some embodiments of the present invention. As discussed previously, joins from a downstream node arrives on the shortest path between the two nodes. Upon receipt of the join as in step 402, the unicast rout table (such as that shown in Table I above) of the receiving node is consulted to provide all possible loop free paths for a given neighbor, including the downstream node, to the receiving node. For Example, as shown in Table I above, if a join arrives from node B 104 to node A 102, it will arrive on link 110. Traffic from node A 102 to node B 104 can then use any of the loop-free alternatives that include links 116, 118, or 120.

Loop-free alternative paths can be tunneled paths to the receiving node. In that fashion, multi-cast traffic is carried in a unicast tunnel to be delivered to the receiving node, which terminates and replicates the traffic to its local receivers. Unicast tunnels are setup using a Unicast Routing Loop Free Alternative path computation when the network is first established. Consequently, each multicast group within a RP or source can be load shared across different paths and thereby make efficient use of all available bandwidth for replication.

In some embodiments, the multicast route tables are installed in such a way that all of the equal-cost multi-path routing (ECMP) paths are construed or grouped as one single logical interface. That way, regardless of an upstream node choosing a particular path, the downstream node can receive the traffic with valid reverse-path forwarding (RPF) checks passed and replicate the traffic towards the destination node.

Table II below illustrates a multicast route table at Node A 102 as for the example network shown in FIG. 1A. In a more conventional scenario for a given RP, all sets of multicast groups would use a single routing tree to reach all local receivers connected to nodes B 104, C 106, and D 108. For a flattened butterfly configuration, as is shown in FIG. 1A, to reach the receivers connected to nodes B 104, C 106, and D 108, the loop-free alternative paths can be used. In Table B, the loop-free alternatives paths to a particular node are labeled with lfa. For example, Blfa designates all loop-free alternative paths to node B 104 from node A 102. Different paths can be load balanced to different groups catering to a single RP or source.

TABLE II

| Multicast Route Table at Node A | |
|---|---|
| Multicast Route | Replication into |
| (*, G1, Vlan x) | local, Blfa, C |
| (*, G2, Vlan x) | local, B, Clfa, Dlfa |
| (*, G3, Vlan x) | local, Blfa, C, Dlfa |
| (*, G4, Vlan y) | local, B, C, Dlfa |
| (*, G5, Vlan y) | local, Blfa, Clfa, D |
| (*, G6, Vlan y) | Clfa, D |
| (*, G7, Vlan z) | Blfa, Dlfa |
| (*, G8, Vlan z) | local, Blfa, D |
| (*, G9, Vlan z) | local, B, C, D |

Embodiments of the invention are also applicable to Virtual Link Trunking (VLT). One of the main aspects of VLT is availability of PIM ECMPs at the VLAN level. A single VLT node with multiple upstream VLANs would provide ECMP paths at the VLAN level reach a given RP or source. The current PIM implementation of PIM VLT is restricted to catering to a single VLT VLAN. However, embodiments of the present invention can be applied to VLT networks since the common VLT link is a member of all the upstream VLANs which could be treated as ECMP paths. Regardless of PIM joins being triggered on different VLANs, the underlying hardware would have one common entry to replicate and thereby duplicate. That entry would include loop-free alternative paths.

In some embodiments, in CLOS networks such as that illustrated in FIG. 3, the logical grouped incoming interface (L3_IIF), which represents the logical ingress interface that accounts for traffic being received on any of the paths from the source or the RP, can be used as a look-up in the multicast route table instead of VLAN, as is shown in Table II. The look-up key, then, would be (*, G, L3_IIF) or (S, G, L3_IIF). One important thing in the achievement of ECMP at the hardware for multicast is to group together multiple logical interfaces using the same underlying physical infrastructure as one signal logical interface. For example, if there are two VLANs (e.g., VLAN 10 and VLAN 20), and an upstream join is triggered for group G from both VLT nodes R1 and R2, the routing table in the underlying hardware would have the single entry (*, G, L3_IIF=1000) OIF=R1, R2, where L3_IIF value of 1000 is assigned for both VLAN 10 and VLAN 20. In this fashion, there is only a single replication of multicast traffic from the upstream node and the downstream node would also pass the RPF checks and replicate the traffic successfully.

In the preceding specification, various embodiments have been described with reference to the accompanying drawings. It will, however, be evident that various modifications and changes may be made thereto, and additional embodiments may be implemented, without departing from the broader scope of the invention as set for in the claims that follow. The specification and drawings are accordingly to be regarded in an illustrative rather than restrictive sense.

What is claimed is:

1. A network node comprising:
   a memory; and
   a processor coupled to the memory, the processor being configured to:
   receive, from another network node, a multicast join message for a multicast group on a shortest path between the network node and the another network node;
   in response to the multicast join message, process the multicast join message, wherein the processing of the multicast join message comprises:
   determining loop-free alternative paths to the another network node;
   adding an entry to a multicast routing table stored in the memory, the entry identifying as multicast paths to the another network node for the multicast group a single logical ECMP (Equal Cost Multiple Paths) interface that groups together the shortest path between the network node and the another network node and each of the loop-free alternative paths as equal cost paths, each of the loop-free alternative paths being a tunneled path set up to enable the another network node to receive multicast traffic with valid reverse-path forwarding (RPF) checks passed when the multicast traffic is transmitted on the single logical ECMP interface via any one of the shortest path and each of the loop-free alternative paths;
   after processing the multicast join message, load-share multicast traffic to the multicast group across the shortest path and each of the loop-free alternative paths by transmitting the multicast traffic on the single logical ECMP interface, wherein the load-sharing comprises:
   receiving multicast packets for replication to the multicast group; and
   replicating the multicast packets to the another network node on the single logical ECMP interface, wherein replicating the multicast packets comprises:
   for each multicast packet, choosing a particular path to replicate the multicast packet, the particular path being one of the shortest path between the network node and the another network node and each of the loop-free alternative paths included in the single logical ECMP interface, the particular path being chosen to load-share the multicast packets across the shortest path and the loop-free alternative paths; and
   replicating the multicast packets on the single logical ECMP interface, each multicast packet being replicated via the particular path chosen for the multicast packet, to perform said load-sharing and cause the another network node to receive each multicast packet with a valid RPF check passed regardless of the path chosen as the particular path.

2. The network node of claim 1, wherein to determine the loop-free alternative paths the processor is further configured to look up the loop-free alternative paths in a unicast routing table.

3. The network node of claim 1, wherein to determine the loop-free alternative paths the processor is further configured to determine trees from a topology between the network node to the another network node.

4. The network node of claim 1, wherein the loop-free alternative paths include all of the loop-free alternative paths between the network node and the another network node.

5. A method of routing traffic, comprising:
   receiving, by a first network node from a second network node, a multicast join message for a multicast group on a shortest path between the first network node and the second network node;
   in response to the multicast join message, processing the multicast join message, wherein the processing of the multicast join message comprises:
   determining, by the first network node, loop-free alternative paths to the second network node;
   adding, by the first network node, an entry to a multicast routing table stored in a memory of the first network node, the entry identifying as multicast paths to the second network node for the multicast group a single logical ECMP (Equal Cost Multiple Paths) interface that groups together the shortest path between the first network node and the second network node and each of the loop-free alternative paths as equal cost paths, each of the loop-free alternative paths being a tunneled path set up to enable the second network node to receive multicast traffic with valid reverse-path forwarding (RPF) checks passed when the multicast traffic is transmitted on the single logical ECMP interface via any one of the shortest path and each of the loop-free alternative paths;
   after processing the multicast join message, load-sharing multicast traffic to the multicast group across the shortest path and each of the loop-free alternative paths by transmitting the multicast traffic on the single logical ECMP interface, wherein the load-sharing comprises:

receiving, by the first network node, multicast packets for replication to the multicast group; and replicating, by the first network node, the multicast packets to the second network node on the single logical ECMP interface, the replicating comprising:

for each multicast packet, choosing a particular path to replicate the multicast packet, the particular path being one of the shortest path between the first network node and the second network node and each of the loop-free alternative paths included in the single logical ECMP interface, the particular path being chosen to load-share the multicast packets across the shortest path and the loop-free alternative paths; and replicating the multicast packets on the single logical ECMP interface, each multicast packet being replicated via the particular path chosen for the multicast packet, to perform said load-sharing and cause the second network node to receive the multicast packet with a valid RPF check passed regardless of the path chosen as the particular path.

6. The method of claim 5, wherein determining the loop-free alternative paths comprises looking up the loop-free alternative paths in a unicast routing table.

7. The method of claim 5, wherein determining the loop-free alternative paths comprises determining trees from a topology between the first network node to the second network node.

8. The method of claim 5, wherein the loop-free alternative paths include all of the loop-free alternative paths between the first network node and the second network node.

9. An information handling system that routes traffic for multicast routing, the system comprising:

a first network node having a memory and a processor coupled to the memory;

the first network node being configured to:

receive, from a second network node, a multicast join message for a multicast group on a shortest path between the first network node and the second network node;

in response to the multicast join message, process the multicast join message, wherein the processing of the multicast join message comprises:

determining loop-free alternative paths to the second network node;

adding an entry to a multicast routing table stored in the memory, the entry identifying as multicast paths to the second network node for the multicast group a single logical ECMP (Equal Cost Multiple Paths) interface that groups together the shortest path between the first network node and the second network node and each of the loop-free alternative paths as equal cost paths, each of the loop-free alternative paths being a tunneled path set up to enable the second network node to receive multicast traffic with valid reverse-path forwarding (RPF) checks passed when the multicast traffic is transmitted on the single logical ECMP interface via any one of the shortest path and each of the loop-free alternative paths;

after processing the multicast join message, load-share multicast traffic to the multicast group across the shortest path and each of the loop-free alternative paths by transmitting the multicast traffic on the single logical ECMP interface, wherein the load-sharing comprises:

receiving multicast packets for replication to the multicast group; and replicating the multicast packets to the second network node on the single logical ECMP interface, the replicating comprising:

for each multicast packet, choosing a particular path to replicate the multicast packet, the particular path being one of the shortest path between the first network node and the second network node and each of the loop-free alternative paths included in the single logical ECMP interface, the particular path being chosen to load-share the multicast packets across the shortest path and the loop-free alternative paths; and replicating the multicast packets on the single logical ECMP interface, each multicast packet being replicated via the particular path chosen for the multicast packet, to perform said load-sharing and cause the second network node to receive the multicast packet with a valid RPF check passed regardless of the path chosen as the particular path.

10. The system of claim 9, wherein to determine the loop-free alternative paths the first network node is further configured to look up the loop-free alternative paths in a unicast routing table.

11. The system of claim 9, wherein to determine the loop-free alternative paths the first network node is further configured to determine trees from a topology between the first network node to the second network node.

12. The network node of claim 1 wherein at least one loop-free alternative path utilizes multiple links.

13. The method of claim 5 wherein at least one loop-free alternative path utilizes multiple links.

14. The information handling system of claim 9 wherein at least one loop-free alternative path utilizes multiple links.

* * * * *